United States Patent [19]

Commandeur

[11] Patent Number: 5,850,800
[45] Date of Patent: Dec. 22, 1998

[54] BOGIE WHEELS WITH CURVED CONTACT SURFACES

[75] Inventor: Johan Albert Commandeur, Zwijndrecht, Netherlands

[73] Assignee: IHC Gusto Engineering B.V., Schiedam, Netherlands

[21] Appl. No.: 785,602

[22] Filed: Jan. 17, 1997

[51] Int. Cl.⁶ .................................................. B63B 21/00
[52] U.S. Cl. ............................................................ 114/230
[58] Field of Search ................................. 114/230, 293; 441/3–5; 384/912, 625

[56] References Cited

U.S. PATENT DOCUMENTS 4,343,055  8/1982  Bergling ........................... 441/3
5,122,000  6/1992  Matsumoto et al. ............ 384/625

*Primary Examiner*—Sherman Basinger
*Attorney, Agent, or Firm*—Young & Thompson

[57] ABSTRACT

The invention relates to a vessel having a turret which is rotatingly mounted within a turret wall. The turret is supported by means of a number of axial bogie wheels. The bogie wheels have a curved metal contact surface with a radius of curvature within 5 and 50 meters, preferably of about 20 meters. The wheel diameter amounts to about 750 mm. The wheels run on circular raceways with a diameter of between 10 and 30 m, preferably about 20 meters. It was found that the bogie wheels have low friction, very little wear and are hardly subject to torsional forces upon rotation.

8 Claims, 4 Drawing Sheets

BOGIE WHEELS WITH CURVED CONTACT SURFACES

BACKGROUND OF THE INVENTION

The invention relates to a vessel comprising a hull and a generally cylindrical turret wall, a turret being rotatingly mounted within the turret wall, a circular raceway being provided on the vessel or on the turret, the turret being supported in an axial direction by a number of bogie wheels connected to the turret or to the vessel and running on the raceway.

Such a structure is known from WO 93/07049. The known turret is supported in axial direction on a plurality of radial arms which carry axial and radial bearing elements. The axial bearing elements are formed by bogie wheels which are supported on a double raceway on the vessel. The bogie wheels are mounted in a bracket which is connected to the radial arms by means of a rubber filler which eliminates sliding movements in the bearings of the wheels in the bogies and will help even out the load on the wheels.

SUMMARY OF THE INVENTION

It is an object of the present invention to provide a vessel which can weathervane around a turret, which is supported on bogie wheels wherein the bogie wheels and the raceway are designed to have a minimum wear and minimum friction, and which will improve load shaving over the wheels.

The vessel according to the invention is characterised in that the bogie wheels have a curved metal contact surface with a radius of curvature of between 5 m and 50 m, preferably of about 20 m, at a wheel diameter of between 300 mm and 1200 mm, the raceway having a diameter between 10 m and 30 m, preferably about 20 m and having a flat contact surface.

By providing a radius of curvature for the contact surfaces of the wheels, excessive loads that act on the wheel edges during use are avoided, such that wear thereof is reduced. By such curvature the contact area as well as the Herzian stress have an elliptical shape.

Furthermore, during movement of the bogie wheels according to the present invention on the circular raceway, the torque on the wheel axis is reduced. Such a torque on the wheel axis would occur in wheels having cylindrical running surfaces due to the difference in speed of the different parts of the wheel along the wheel axis, when the wheel is moved on a circular track.

For the embodiment according to the present invention wherein the bogie wheels have curved contact surfaces, the raceway can be flat or can have a curvature in an opposite direction to the wheel curvature. The advantages with respect to reduction of wear and friction can also be achieved by the use of a curved raceway in combination with flat contact surfaces for the bogie wheels, according to a second embodiment of the present invention.

According to a preferred embodiment the bogie wheels have a Rockwell C hardness of at least 35 at the contact surface. The hardness of the contact surface of the bogie wheels is greater than the hardness of the raceways. Preferably the hardness of the contact surface of the bogie wheels is at least 1.2 to 2 times the hardness of the raceway. By hardening the contact surface of the bogie wheels up to a depth of several millimeters, preferably at least 10 millimeters, the stresses occurring during use can be taken up.

Suitable materials for the bogie wheels are for instance 42 CrMo4 or 30 CrNiMo8 steel, and for the raceway Hardox 400 steel as available from Svenskt Stål, Oxelösund, Sweden.

BRIEF DESCRIPTION OF THE DRAWINGS

The invention will be explained with reference to the accompanying drawings. In the drawings.

DESCRIPTION OF THE PREFERRED EMBODIMENTS

Figure 1:
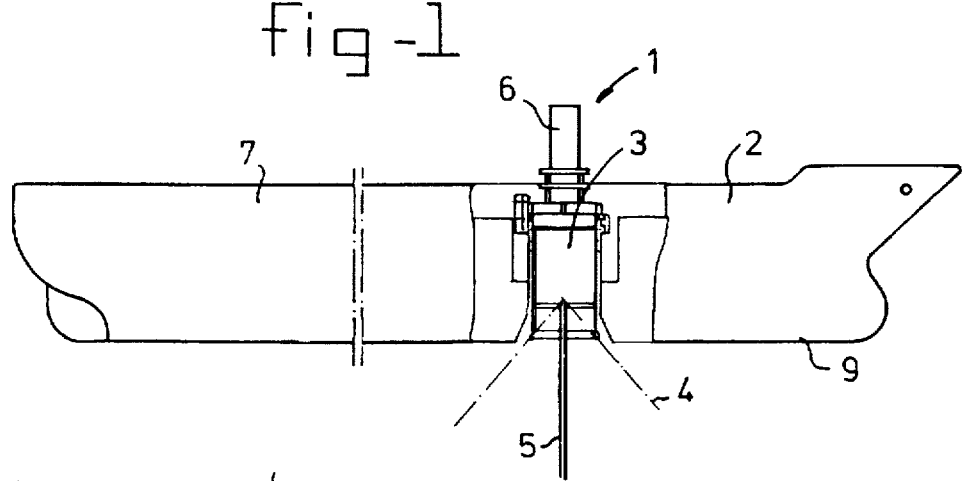
FIG. 1 shows a schematic sectional view of a vessel according to the present invention.

FIG. 1 shows a vessel 1 such as a tanker, which in its hull 2 is provided with a cylindrical turret wall extending from deck level 7 to keel level 9. Inside the turret wall, a turret 3 is mounted. Near keel level the turret 3 is connected to catenary anchor lines 4 which have been schematically indicated in the Figure. A number of risers 5 are on one side connected to a sub sea structure, such as a well head, and on the other side to the geo-stationary turret 3. The vessel 1 can weathervane around the turret 3 while oil and gas are being loaded from the sub-sea structure. On top of turret 3, a multi-line swivel stack 6 may be placed for coupling the risers 5 to storage tanks on the vessel 1 or to other tanker vessels.

Figure 2:
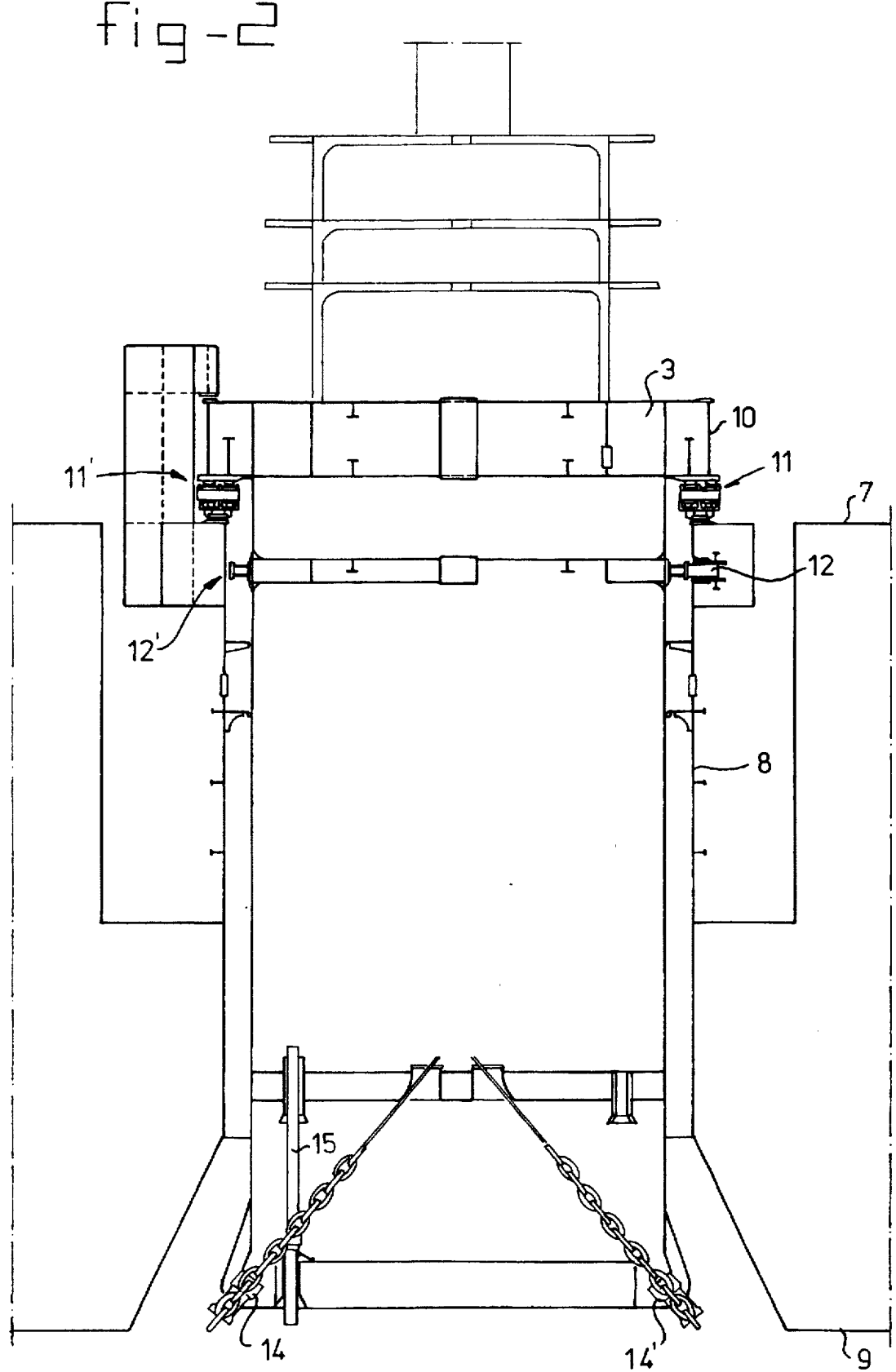
FIG. 2 shows a side view of the turret of FIG. 1.

As can be seen from FIG. 2, the turret 3 is suspended within the cylindrical turret wall 8 by means of axial bogie wheel assemblies 11, 11' which support a stiff upper ring 10 of the turret. Below the axial bogie wheel assemblies 11, 11' radial wheels 12, 12' support the turret in a radial direction. At keel level 9 it can be seen that the anchor lines 4 are comprised of chains 14, 14' which are connected to the lower edge of the turret 3 by means of chain stoppers. A single riser 15 is depicted entering through the bottom of the turret 3 into the cylindrical space thereof.

Figure 3:
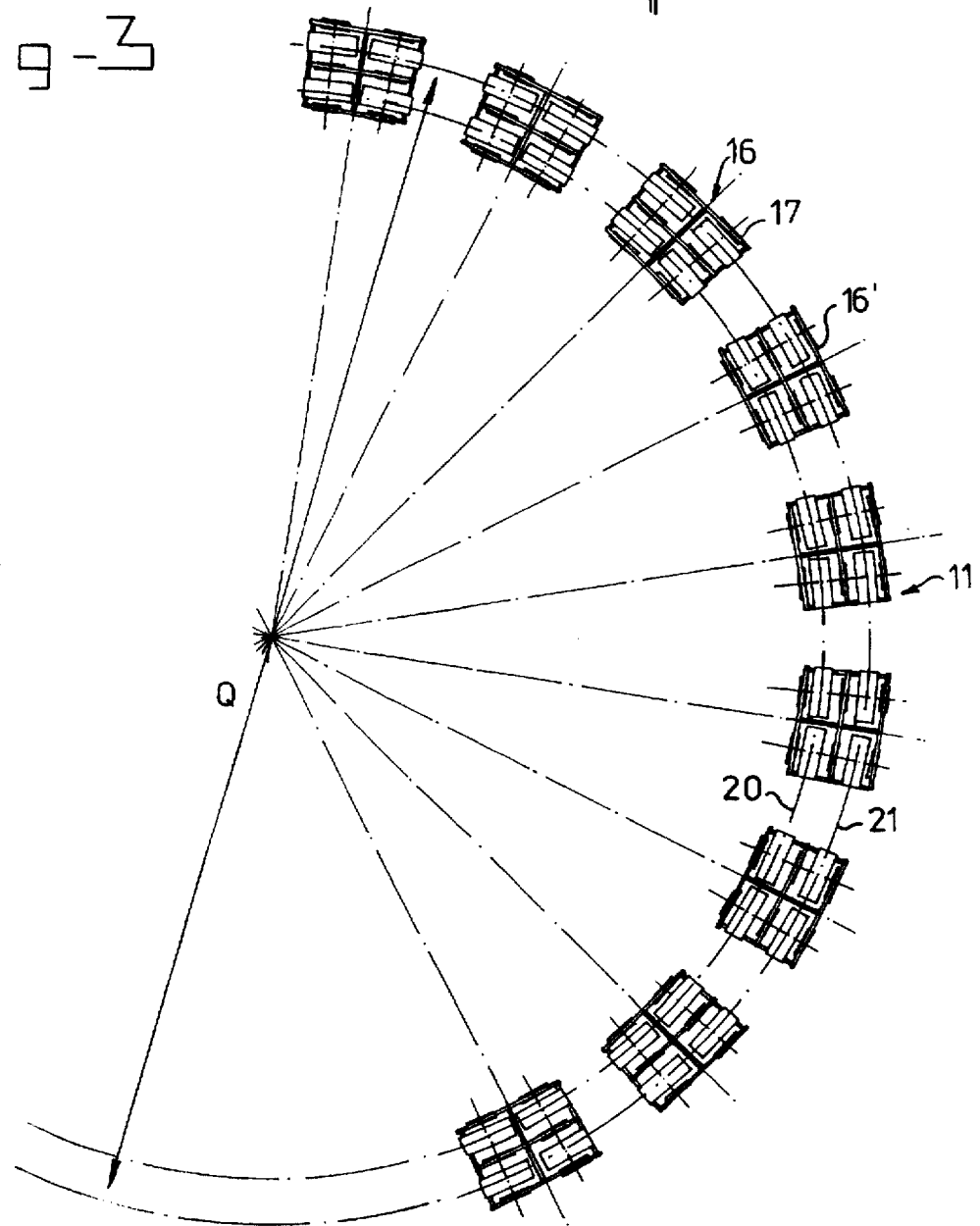
FIG. 3 shows a plan view of a section of the bogie wheels of the turret suspension of FIG. 2.

FIG. 3 shows a plan view of the axial wheel assemblies 11 which is comprised of sets of bogie wheels 16, 16'. Each set comprises four wheels. The wheels run on raceways 20, 21, which have a diameter Q of about 20 meters.

Figure 4:
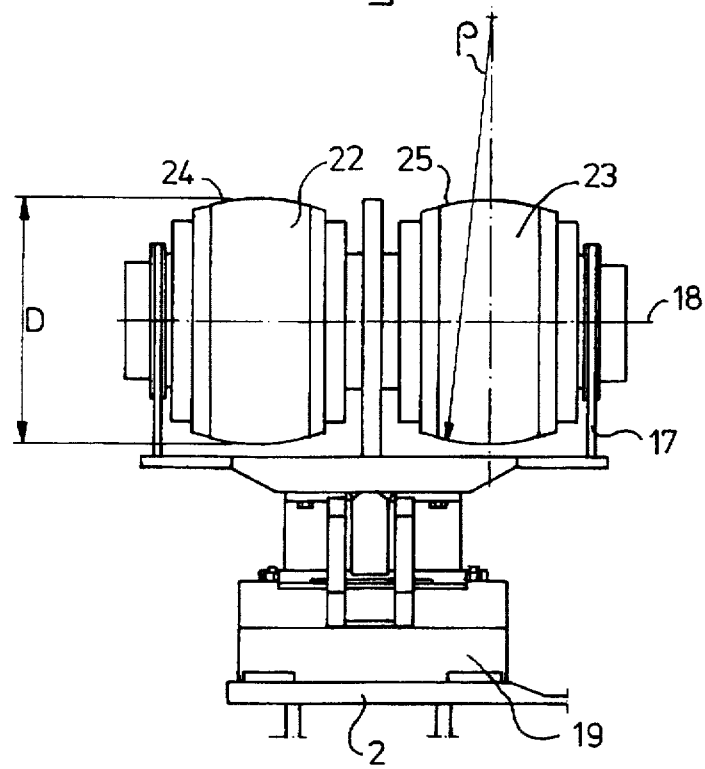
FIG. 4 shows a side view of a pair of bogie wheels according to the present invention.
Figure 5:
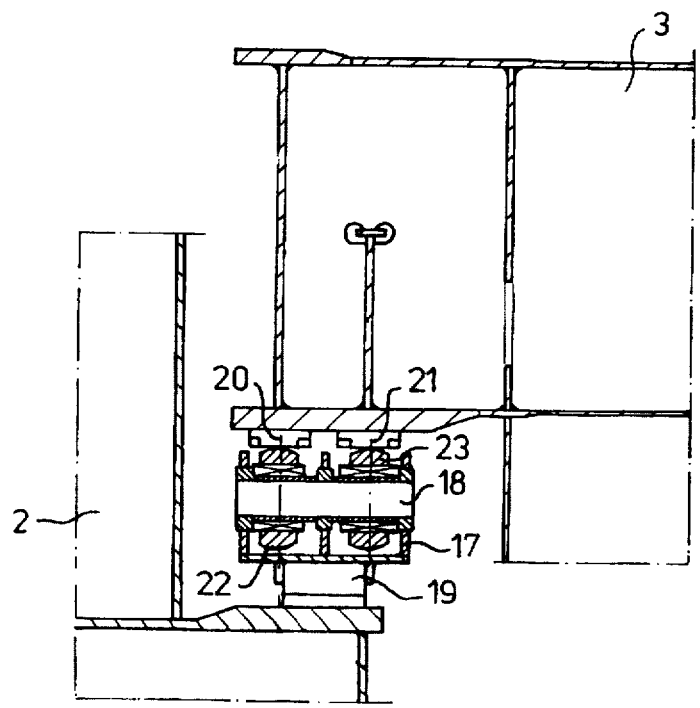
FIG. 5 shows the bogie wheels of FIG. 4 mounted on a vessel supporting the rotatable turret.

As shown in FIGS. 4 and 5, the axis 18 of the wheels 22, 23 in each set of bogie wheels is mounted in a frame 17 which is connected to the vessel 2 via a mounting plate 19. The raceways 20, 21 are placed on the turret 3. It is however also possible to connect the wheels 22, 23 to the turret 3 while placing the raceways 20, 21 on the hull 2.

As shown in FIG. 4 the wheels 22, 23 have rounded contact surfaces 24, 25. The radius or curvature ρ of the contact surfaces 24, 25 amounts to about 20 meters. The wheel diameter D is 750 mm.

Figure 6:
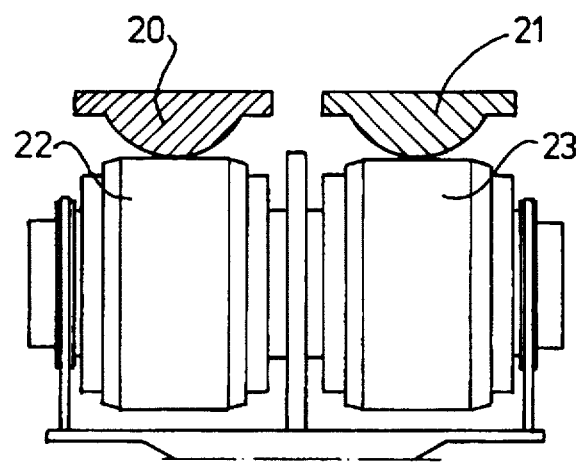
FIG. 6 shows a similar bogie wheel arrangement as FIG. 5, wherein the contact surface of the wheels is flat, the raceways being curved.

FIG. 6 shows an alternative embodiment wherein the wheels 22, 23 have flat contact surfaces and the raceways 20, 21 have a radius of curvature.

Figure 7:
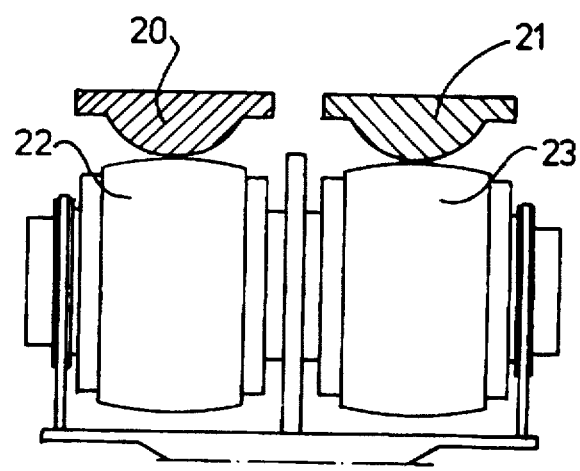
FIG. 7 shows an embodiment in which both the wheels and raceway have curved contact surfaces.

FIG. 7 shows a further alternative embodiment wherein both the wheels 22, 23 and the raceways 20, 21 have curved contact surfaces.

I claim:

1. A vessel comprising a hull, a generally cylindrical turret wall, a turret rotatingly mounted within the turret wall, and a circular raceway on one of the vessel and the turret, the turret being supported in an axial direction by plural bogie wheels connected to one of the turret and the vessel and running on the raceway, wherein the bogie wheels have a curved metal contact surface with a radius of curvature of between 5 m and 50 m and a wheel diameter of between 300 mm and 1200 mm, the raceway having a diameter between 10 m and 30 m, and having a flat contact surface, wherein the Rockwell C hardness of the contact surface of the bogie wheels is at least 1.2 times the Rockwell C hardness of the raceway.

2. The vessel according to claim 1, wherein the bogie wheels have a Rockwell C hardness of at least 35 at the contact surface.

3. The vessel of claim 1, wherein the radius of curvature of the bogie wheels is about 20 m.

4. A vessel comprising a hull, a generally cylindrical turret wall, a turret rotatingly mounted within the turret wall, and a circular raceway on one of the vessel and the turret, the turret being supported in an axial direction by plural bogie wheels connected to one of the turret and the vessel and running on the raceway, the bogie wheels having flat contact surfaces, wherein the raceway has a curved metal contact surface with a radius of curvature of between 5 m and 50 m and a diameter between 10 m and 30 m, the wheels having a diameter of between 300 mm and 1200 mm, wherein the Rockwell C hardness of the contact surface of the bogie wheels is at least 1.2 times the Rockwell C hardness of the raceway.

5. The vessel according to claim 4, wherein the bogie wheels have a Rockwell C hardness of at least 35 at the contact surface.

6. The vessel of claim 4, wherein the radius of the curvature of the raceway is about 20 m.

7. A vessel comprising a hull, a generally cylindrical turret wall, a turret rotatingly mounted within the turret wall, and a circular raceway on one of the vessel and the turret, the turret being supported in an axial direction by plural bogie wheels connected to one of the turret and the vessel and running on the raceway, wherein the bogie wheels have a curved metal contact surface with a radius of curvature of between 5 m and 50 m and a wheel diameter of between 300 mm and 1200 mm, the raceway having a curved metal contact surface with a radius of curvature of between 5 m and 50 m and a diameter of between 10 m and 30 m, wherein the Rockwell C hardness of the contact surface of the bogie wheels is at least 1.2 times the Rockwell C hardness of the raceway.

8. The vessel according to claim 7, wherein the bogie wheels have a Rockwell C hardness of at least 35 at the contact surface.

* * * * *